D. W. C. Mc. Master,

*Clothes-Line Fastener,*

Nº 83,075. Patented Oct. 13, 1868.

Witnesses:
F. S. Spirig.
Wm. A. Morgan.

Inventor:
D. W. C. McMaster,
per Munn & Co
attys.

D. W. C. M<sup>c</sup>MASTER, OF SOUTHBOROUGH, MASSACHUSETTS.

Letters Patent No. 83,075, dated October 13, 1868.

IMPROVED LINE-HOLDER.

The Schedule referred to in these Letters Patent and making part of the same.

*To all whom it may concern:*

Be it known that I, D. W. C. McMASTER, of Southborough, in the county of Worcester, and State of Massachusetts, have invented a new and improved Line-Holder; and I do hereby declare that the following is a full, clear, and exact description thereof, which will enable those skilled in the art to make and use the same, reference being had to the accompanying drawings, forming part of this specification.

This invention relates to a device for holding clothes-lines, and lines, cords, or ropes used for other purposes, and it consists in arranging two ribbed disk-plates upon a central pin or arbor, with a V-shaped groove between them, in which groove the cord is held, as will be hereinafter described more fully.

Similar letters of reference indicate corresponding parts.

Figure 1:
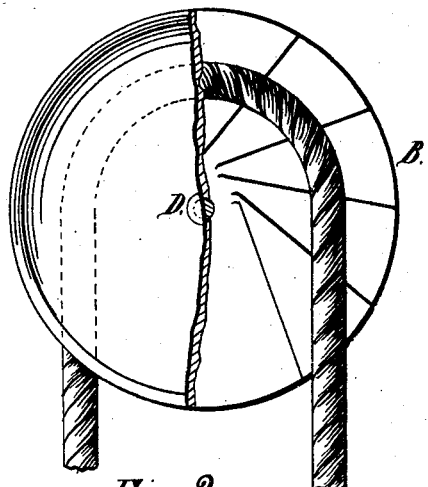
Figure 1 is a view of the back disk, partly in section, represented as when the outer disk is removed.
Figure 2:
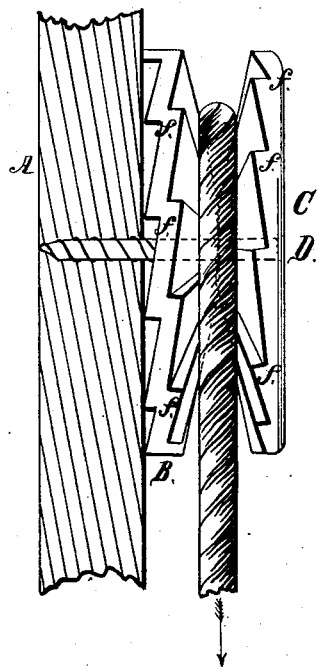
Figure 2 is an edge view of the holder; representing the two disks on the arbor, showing the V-shaped ribbed groove and the line in place.

A represents a wall, post, or fixture of any suitable kind, either in-doors or out, to which the fastener is attached.

B is the inner disk, which is ribbed on both sides—on the back side to prevent the holder from turning, and on the front side for holding the line.

C is the outer disk, which is ribbed only on the inside.

These disks are attached to A by a central pin, screw, or arbor, marked D, as seen in the drawing.

E represents the line.

The ribbed faces of the disks are so shaped that a V-shaped groove is formed between them.

*f* represents the inclined ridges on the face-sides of the disks, which are of uniform size, shape, and position on their respective faces.

The ridges or projections start from the peripheries of the disks, as seen in the drawing, and terminate near their centres.

In fastening, the line is placed in the groove (or a hitch around the holder is taken) when being drawn in the direction of the arrow.

It will be seen that the line will be forced, by the shape of the groove and the ribs, towards the centre, and will be held the tighter, the harder it is drawn.

This action will force the disk B against the wood, which will, by the ribs or projections on its back, prevent the holder from turning when the line is drawn.

Placing the ribs *f* at an inclination of about thirty degrees, tends to draw the line towards the centre.

Although designed more especially for clothes-lines, this holder may be applied to other uses, to advantage, as to cord-pulleys for driving machinery, to prevent slipping, and for holding cords or rope in other situations.

I do not confine myself to the particular form of the disks or the ribs *f*, nor to any particular size or kind of material in making them.

I claim as new, and desire to secure by Letters Patent—

The disks B C, constructed as described, with the radial ribs, and arranged with relation to each other and the fixture A, in the manner herein set forth, for the purpose specified.

D. W. C. McMASTER.

Witnesses:
 THOMAS McMASTER,
 M. A. CROUCH.